United States Patent
Takano et al.

(10) Patent No.: US 9,661,631 B2
(45) Date of Patent: May 23, 2017

(54) COMMUNICATION DEVICE AND COMMUNICATION METHOD, COMPUTER PROGRAM, AND COMMUNICATION SYSTEM FOR MULTIPLEXING AND TRANSMITTING A VARIABLE-LENGTH FRAME

(75) Inventors: Hiroaki Takano, Saitama (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 1071 days.

(21) Appl. No.: 13/318,185

(22) PCT Filed: Mar. 17, 2010

(86) PCT No.: PCT/JP2010/054579
§ 371 (c)(1),
(2), (4) Date: Oct. 31, 2011

(87) PCT Pub. No.: WO2010/128607
PCT Pub. Date: Nov. 11, 2010

(65) Prior Publication Data
US 2012/0044904 A1    Feb. 23, 2012

(30) Foreign Application Priority Data
May 8, 2009    (JP) ............................... P2009-113866

(51) Int. Cl.
*H04W 72/04*    (2009.01)
*H04L 1/00*    (2006.01)
(Continued)

(52) U.S. Cl.
CPC ......... *H04W 72/046* (2013.01); *H04L 1/0003* (2013.01); *H04L 1/0007* (2013.01);
(Continued)

(58) Field of Classification Search
CPC ............ H04W 74/0816; H04W 72/046; H04L 1/1671; H04L 1/1854; H04L 27/2602; H04L 5/0064
See application file for complete search history.

(56) References Cited

U.S. PATENT DOCUMENTS

2005/0002355 A1*  1/2005  Takano ...................... 370/329
2006/0114928 A1   6/2006  Utsunomiya et al.
(Continued)

FOREIGN PATENT DOCUMENTS

CN    101292454 A    10/2008
EP    1587266 A2     10/2005
(Continued)

OTHER PUBLICATIONS

Jan. 9, 2014, CN communication issued for related CN application No. 201080019408.3.

(Continued)

*Primary Examiner* — Jackie Zuniga Abad
(74) *Attorney, Agent, or Firm* — Paratus Law Group, PLLC

(57) ABSTRACT

A communication operation is suitably performed with application of Space Division Multiple Access in which wireless resources on a space axis are shared by a plurality of users.
If a frequency width is narrowed to 20 MHz when the communication quality is high, the amount of transmittable data can be about half, and the frame length can be doubled. If the frame length is rather excessively long, switching is performed to a modulation scheme with the greater number of states to shorten the frame length. On the other hand, when the communication quality is low, switching is performed to a modulation scheme with the smaller number of states to lengthen the frame length. When the frame length (Continued)

is still insufficient, switching is performed to a narrow frequency width to lengthen the frame length.

5 Claims, 12 Drawing Sheets

(51) Int. Cl.
  *H04L 5/00* (2006.01)
  *H04L 1/18* (2006.01)
  *H04L 27/26* (2006.01)
  *H04B 7/06* (2006.01)

(52) U.S. Cl.
  CPC .......... *H04L 1/1854* (2013.01); *H04L 5/0023* (2013.01); *H04L 5/0064* (2013.01); *H04L 27/2602* (2013.01); *H04B 7/0617* (2013.01)

(56) References Cited

U.S. PATENT DOCUMENTS

| | | | |
|---|---|---|---|
| 2007/0147322 A1* | 6/2007 | Agrawal et al. | 370/338 |
| 2007/0291913 A1 | 12/2007 | Trainin | |
| 2010/0248635 A1* | 9/2010 | Zhang | H04B 7/0413 455/63.1 |

FOREIGN PATENT DOCUMENTS

| | | |
|---|---|---|
| EP | 1865672 A2 | 12/2007 |
| EP | 1 933 490 A1 | 6/2008 |
| EP | 2362580 A2 | 8/2011 |
| JP | 2855172 | 11/1998 |
| JP | 2001-148646 | 5/2001 |
| JP | 2004-328570 | 11/2004 |
| JP | 2005-102136 | 4/2005 |
| JP | 2008-236065 | 10/2006 |
| JP | 2007-36627 | 2/2007 |
| JP | 2007-036627 | 2/2007 |
| JP | 2007-89113 | 4/2007 |
| JP | 2009-506679 | 2/2009 |
| KR | 10-2008-0068838 | 7/2008 |
| WO | WO 2007/025160 A2 | 3/2007 |
| WO | WO 2007/052766 | 5/2007 |
| WO | WO2007/052766 | 5/2007 |
| WO | WO 2007/052766 A1 | 5/2007 |
| WO | WO2008/136459 A1 | 11/2008 |
| WO | WO2010/022257 A1 | 2/2010 |

OTHER PUBLICATIONS

International Search Report from Japanese Patent Office for PCT/JP2010/054579, Dated Jun. 22, 2010.
Dec. 11, 2012 Japanese Office Action of related JP Patent Application No. 2009-113866.
Apr. 9, 2013, JPO Communication for Related Application No. 2009-113866.
Jan. 8, 2016, European Search Report for related EP Application No. 10772131.8-1860.
Huawei, Physical Layer technologies for LTE-Advanced, 3GPP TSG RAN WG1#53, May 5-9, 2008, pp. 1-8, Kansas City, MO., USA.
Apr. 8, 2016, European Search Report for related EP Application No. 10772131.8.

* cited by examiner

COMMUNICATION DEVICE AND COMMUNICATION METHOD, COMPUTER PROGRAM, AND COMMUNICATION SYSTEM FOR MULTIPLEXING AND TRANSMITTING A VARIABLE-LENGTH FRAME

CROSS REFERENCE TO PRIOR APPLICATION

This application is a National Stage Patent Application of PCT International Patent Application No. PCT/JP2010/054579 (filed on Mar. 17, 2010) under 35 U.S.C. §371, which claims priority to Japanese Patent Application No. 2009-113866 (filed on May 8, 2009), which are all hereby incorporated by reference in their entirety.

TECHNICAL FIELD

The present invention relates to a communication device and a communication method, a computer program, and a communication system to which Space Division Multiple Access (SDMA) in which a plurality of users share wireless resources on a space axis is applied, and particularly to a communication device and a communication method, a computer program, and a communication system used for multiplexing and transmitting a frame of a variable-length frame format to a plurality of users.

BACKGROUND ART

Wireless communication has lifted the burden of wiring in wired communication of the past, and furthermore, contributed to its use as a technique for realizing communication in moving objects. As a standard relating to a wireless LAN (Local Area Network), for example, IEEE (The Institute of Electrical and Electronics Engineers) 802.11 can be exemplified. IEEE 802.11a/g has already been widely distributed.

According to the standard of IEEE 802.11a/g, a modulation scheme in which a communication rate of 54 Mbps at the maximum (physical layer data rate) is applied is supported in 2.4 GHz or 5 GHz frequency band, using Orthogonal Frequency Division Multiplexing (OFDM). In addition, in IEEE 802.11n that is the extended standard of the foregoing, an even higher bit rate is realized by adopting a MIMO (Multi-Input Multi-Out) communication scheme. Herein, the MIMO is a communication scheme in which a plurality of antenna elements is provided in both of a transmitter side and a receiver side to realize a spatially multiplexed stream (as is well known). While a high throughput (HT) over 100 Mbps has been achieved with IEEE 802.11n, an even higher speed increase has been demanded as the amount of transmitted content information increases.

For example, it is possible to enhance throughput in one-to-one communication, keeping lower-level compatibility by increasing the number of streams spatially multiplexed with the number of antennas in a MIMO communication device increased. However, in the future, the enhancement of throughput by a plurality of users as a whole will be demanded in communication, in addition to throughput per user.

In the conference of the working group of IEEE 802.11ac, it was aimed to use a frequency band of equal to or lower than 6 GHz, and to set a wireless LAN standard of which the data transmission rate is over 1 Gbps, but for the realization, Space Division Multiple Access (SDMA) scheme in which a plurality of users shares wireless resources on a space axis is effective as the multi-user MIMO (MU-MIMO), or SDMA.

Currently, the Space Division Multiple Access is under examination as one of an underlying technology of a next generation mobile telephone system based on Time Division Multiple Access (TDMA) such as a PHS (Personal Handyphone System), and LTE (Long Term Evolution). In addition, attention has been paid to one-to-multiple communication as described above in the field of wireless LAN, but there is almost no applicable example thereof. It is also considered that the reason is that multiplexing a plurality of users with satisfactory efficiency in packet communication is difficult.

For comparison, a communication system has been proposed which is attained by combining two techniques of carrier sensing and the SDMA by adaptive array antennas in the standard of IEEE 802.11 of the past, using RTS, CTS, ACK packets that have a packet format and keep lower-level compatibility with the standard of IEEE 802.11 of the past (for example, refer to PTL 1).

Herein, when the SDMA is applied to a wireless LAN, a case can be considered in which a variable-length frame is multiplexed on the same time axis. There is no problem if the lengths of transmission data for each of a plurality of users are the same as a whole, but if frame lengths multiplexed according to differences in the lengths of transmission data differ, the total transmission power radically changes as the number of frames multiplexed during transmission period increases. If frames with different lengths are multiplexed without changes and transmitted, there is a possibility of bring about a problem in various senses that power distribution in a frame for RCPI (Received Channel Power Indicator) that is standardized in IEEE 802.11 is not regular, which triggers an unstable operation in Auto Gain Control (AGC) at a reception side. For this reason, it is necessary to transmit frames multiplexed on the same time axis with the same frame length at the final stage, even if the transmission data lengths differ for each user.

In a system of a fixed frame format such as a cellular system of the past, for example, it is possible to perform frame compensation, or the like with insertion of data for diversity (for example, refer to PTL 2), scheduling of assigned time (for example, refer to PTL 3), a variable data rate (for example, refer to PTLs 4 and 5), and variable channel configuration (for example, refer to PTL 6). With regard to this, it is difficult to apply this related art as the system which employs a variable-length format such as a wireless LAN has a fundamentally different configuration.

CITATION LIST

Patent Literature

PTL 1: Japanese Unexamined Patent Application Publication No. 2004-328570
PTL 2: Japanese Unexamined Patent Application Publication No. 2001-148646
PTL 3: PCT Japanese Translation Patent Publication No. 2009-506679
PTL 4: Japanese Unexamined Patent Application Publication No. 2008-236065
PTL 5: Japanese Patent No. 2855172
PTL 6: Japanese Unexamined Patent Application Publication No. 2007-89113

DISCLOSURE OF INVENTION

Technical Problem

An objective of the invention is to provide an excellent communication device and communication method, computer program, and communication system which can perform a communication operation by appropriately applying the SDMA in which a plurality of users shares wireless resources on a space axis thereto.

Another objective of the invention is to provide an excellent communication device and communication method, computer program, and communication system which can multiplex and appropriately transmit frames of a variable-length frame format to a plurality of users.

Still another objective of the invention is to provide an excellent communication device and communication method, computer program, and communication system which can multiplex and appropriately transmit frames of a variable-length frame format to a plurality of users, avoiding a radical change in the total transmission power to a reception side even when transmitted data lengths to each of a plurality of users are not uniform.

Solution to Problem

The present application takes the above problem into consideration, and an embodiment of the invention is a communication device including a communication unit corresponding to Space Division Multiple Access in which wireless resources on the space axis are assigned to a plurality of users and frames are multiplexed, a modulation and demodulation unit which modulates and demodulates frames in the communication unit for each of the plurality of users, a frequency bandwidth setting unit which sets in the communication device a frequency bandwidth used in frames for each of the plurality of users, and a data processing unit which processes frames for each of the plurality of users and determines each of a modulation scheme applied in the modulation and demodulation unit and a frequency bandwidth set in the frequency bandwidth setting unit, and the data processing unit determines different frequency bandwidths for the plurality of users, and the communication unit multiplexes and simultaneously transmits frames with different frequency bandwidths.

According to an embodiment of the invention, the data processing unit of the communication device is configured to determine a frequency bandwidth for each user so that the lengths of frames simultaneously transmitted to each of the plurality of users are equal to each other.

According to an embodiment of the invention, the data processing unit of the communication device is configured to determine a frequency bandwidth and a modulation scheme for each user so that the lengths of frames simultaneously transmitted to each of the plurality of users are equal to each other.

According to an embodiment of the invention, the data processing unit of the communication device is configured to further determine a modulation scheme for each user when the length of a frame cannot be adjusted only in determining a frequency bandwidth for each user.

The invention may further comprise a communication device including a Space Division Multiple Access unit which assigns wireless resources on the space axis to a plurality of users for multiplexing, a frequency bandwidth setting unit which sets a frequency bandwidth used in frames for each of the plurality of users, and a data processing unit which processes frames for each of the plurality of users and determines the frequency bandwidth set in the frequency bandwidth setting unit, the frequency bandwidth setting unit can set a minimum frequency bandwidth at a plurality of positions over whole usable frequency bands and can set a frequency band obtained by duplicating the minimum frequency band at two or more positions, and the data processing unit transmits a transmission requested (RTS) frame by duplicating a minimum frequency bandwidth at all of the plurality of positions when the transmission request frame is transmitted for each of the plurality of users, then a checking notification (CTS) frame is received from each of the plurality of users, and then a communication sequence for starting transmission of data frames is performed.

According to an embodiment of the invention, the communication unit of the communication device is configured to receive the checking notification frame from each of the plurality of users in a frequency bandwidth in which data frames are transmitted to each of the plurality of users.

According to an embodiment of the invention, the data processing unit of the communication device is configured to generate an RTS frame including a field of RTS 802.11 that follows the past standard and a field of RTS add that does not need to follow the past standard, and to describe a frequency bandwidth and a frequency position used in transmission frames for each of the plurality of users in the field of RTS add.

In addition, an embodiment of the invention is a communication method in which wireless resources on the space axis are assigned to a plurality of users and frames are multiplexed, including determining different frequency bandwidths for the plurality of users, and multiplexing and simultaneously transmitting frames with different frequency bandwidths.

In addition, an embodiment of the invention is a communication method in which wireless resources on the space axis are assigned to a plurality of users and frames are multiplexed, a minimum frequency bandwidth can be set at a plurality of positions over whole usable frequency bands, and a frequency band obtained by duplicating the minimum frequency band can be set at two or more positions, and a transmission requested (RTS) frame is transmitted by duplicating a minimum frequency bandwidth at all of the plurality of positions when the transmission request frame is transmitted for each of the plurality of users, then a checking notification (CTS) frame is received from each of the plurality of users, and then a communication sequence for starting transmission of data frames is performed.

In addition, an embodiment of the invention is a computer program described in a computer readable form so as to execute on a computer a process for controlling a communication operation in a communication device including a communication unit corresponding to Space Division Multiple Access in which wireless resources on the space axis are assigned to a plurality of users and frames are multiplexed, a modulation and demodulation unit which modulates and demodulates frames for each of the plurality of users, and a frequency bandwidth setting unit which sets in the communication unit a frequency bandwidth used in frames for the plurality of users, the program causes a computer to function as a data processing unit which determines each of a modulation scheme applied in the modulation and demodulation unit and a frequency bandwidth set in the frequency bandwidth setting unit, and the data processing unit determines different frequency bandwidths for the plurality of users and multiplexes and simultaneously transmits frames with different frequency bandwidths.

In addition, an embodiment of the invention is a computer program described in a computer readable form so as to execute on a computer a process for controlling a communication operation in a communication device including a communication unit corresponding to Space Division Multiple Access in which wireless resources on the space axis are assigned to a plurality of users and frames are multiplexed, and a frequency bandwidth setting unit which sets in the communication unit a frequency bandwidth used in frames for the plurality of users, which can set minimum frequency bandwidths at a plurality of positions over whole usable frequency bands and can set a frequency band obtained by duplicating the minimum frequency band at two or more positions, the program causes the computer to function as a data processing unit which processes frames for each of the plurality of users and determines a frequency bandwidth set in the frequency bandwidth setting unit, and the data processing unit transmits a transmission requested (RTS) frame by duplicating a minimum frequency bandwidth at all of the plurality of positions when the transmission request frame is transmitted for each of the plurality of users, then a checking notification (CTS) frame is received from each of the plurality of users, and then a communication sequence for starting transmission of data frames is performed.

Each of the computer programs relating to embodiments of the invention define a computer program described in a computer readable form so as to realize a predetermined process on the computer. In other words, by installing the computer programs in a computer, cooperative action is exhibited on the computer and the same effects as of the communication devices of embodiments of the invention can be obtained.

In addition, an embodiment of the invention is a communication system including a first communication device in which a frequency bandwidth used in frame transmission for a plurality of users are determined, and wireless resources on the space axis are assigned to a plurality of users and frames with different frequency bandwidths are multiplexed and simultaneously transmitted, and a plurality of second communication devices which corresponds to each of the plurality of users and receives frames destined for the devices themselves.

However, the "system" mentioned here refers to an object resulting from a logical set of a plurality of devices (or a functional module realizing a specific function), irrespective of whether or not each device or functional module is included in a single housing.

In addition, an embodiment of the invention is a communication system in which a minimum frequency bandwidth can be set at a plurality of positions over whole usable frequency bands and a frequency band obtained by duplicating the minimum frequency band at two or more positions can be set, including a first communication device which transmits a transmission requested (RTS) frame for each of the plurality of uses by duplicating a minimum frequency bandwidth at all of the plurality of positions and starts transmitting data frames after a checking notification (CTS) frame is received from each of the plurality of users, and a plurality of second communication devices which receives the transmission requested (RTS) frame destined for the stations themselves and returns the checking notification (CTS) frame.

Advantageous Effects of Invention

According to the present invention, it is possible to provide a communication device and a communication method, a computer program, and a communication system which are excellent and can satisfactorily perform a communication operation applying Space Division Multiple Access in which wireless resources on the space axis are shared by a plurality of users.

In addition, according to the invention, it is possible to provide a communication device and a communication method, a computer program, and a communication system which are excellent and can multiplex and satisfactorily transmit frames in a variable-length frame format while avoiding a radical change in the total transmission power in the transmission side even when the length of transmission data for each of a plurality of users is not necessarily uniform.

In addition, according to the invention, it is possible to provide a communication device and a communication method, a computer program, and a communication system which are excellent and can multiplex and satisfactorily transmit frames in a variable-length frame format while avoiding a radical change in the total transmission power in the transmission side by transmitting each of frames multiplexed on the same time axis with the same frame length at the final even if the lengths of transmission data of each user vary.

In addition, according to the invention, it is possible to provide a communication device and a communication method, a computer program, and a communication system which are excellent, can enhance the throughput of a plurality of whole users using two methods of Space Division Multiple Access and the expansion of a frequency bandwidth, and can multiplex and satisfactorily transmit frames in a variable-length frame format by adaptively setting a modulation scheme and a frequency bandwidth used in transmission frames destined for each user.

According to embodiments of the invention, it is possible to determine different frequency bandwidths for each user, and to multiplex and simultaneously transmit frames with different frequency bandwidths.

According to an embodiment of the invention, it is possible to lengthen the time in which transmission is continued by narrowing transmission frames destined for a user further than the original frequency bandwidth. In addition, on the contrary, it is possible to shorten the time in which transmission is continued by expanding the frame further than the original frequency bandwidth. When the lengths of frames which are simultaneously transmitted and destined for each user differ, there is inconvenience in that a waste of communication bands occurs due to radical changes in the total transmission power, which leads to unstable operations in the reception side. In regard to this matter, according to an embodiment of the invention, it is possible to make the lengths of a plurality of frames simultaneously transmitted coincide with one another, and to resolve the above inconvenience. In addition, since the lengths of frames coincide with one another without performing padding, bands are not wasted.

According to an embodiment of the invention, it is possible to perform control of the frame length of each frame that the communication device performing Space Division Multiple Access spatially multiplexes by combining a frequency bandwidth and a modulation scheme. For example, the frame length is doubled by setting to a half of the original frequency bandwidth, but when the communication quality is sufficiently high, it is possible to perform close control of the frame length by switching to a modulation scheme with the greater number of states and shortening the frame length. Alternatively, when the communication quality is not satisfactory, it is possible to lengthen the frame length by switching to a modulation scheme with the smaller number of states, and to further lengthen the frame length by narrowing the frame further than the original frequency band.

In addition, according to an embodiment of the invention, when the length of a frame can be adjusted only in determining a frequency bandwidth for each user, it is possible to more closely control the length of the frame by further determining a modulation scheme for each user.

The inventions described in various embodiments of the application can be applied to a wireless LAN environment in which the minimum frequency bandwidth can be set at a plurality of positions over the whole usable frequency bands, such as 20 MHz, 40 MHz, and 80 MHz. Under such a wireless LAN environment, it is necessary to secure a band over the whole frequency bands to be used. According to the inventions described in various embodiments of the application, a hidden terminal which can be operated only in the minimum frequency bandwidth and follows the past standard can also receive RTS frames. Therefore, it is possible to realize collision avoidance while keeping low-level compatibility using RTS/CTS handshake of the past.

According to an embodiment of the invention, each communication station serving as the transmission destination of RTS frames returns CTS frames following the past standard which can be operated only with the minimum frequency bandwidth, and receives data frames from the transmission source of the RTS frames. In addition, the communication device can learn the weight of antennas for Space Division Multiple Access based on a checking notification frame received from each of a plurality of users by causing the checking notification frame from each of the plurality of users to include a known sequence for learning the weight of the antennas for Space Division Multiple Access.

According to an embodiment of the invention, the transmission source of the RTS frames can designate a usage bandwidth for each terminal station serving as the transmission destination of multiplexed frames.

Still another object, characteristic, and advantage of the present invention will be clarified by detailed description based on an embodiment of the invention to be described later and accompanying drawings.

DESCRIPTION OF EMBODIMENTS

Hereinafter, embodiments of the invention will be described in detail referring to drawings.

Figure 1:
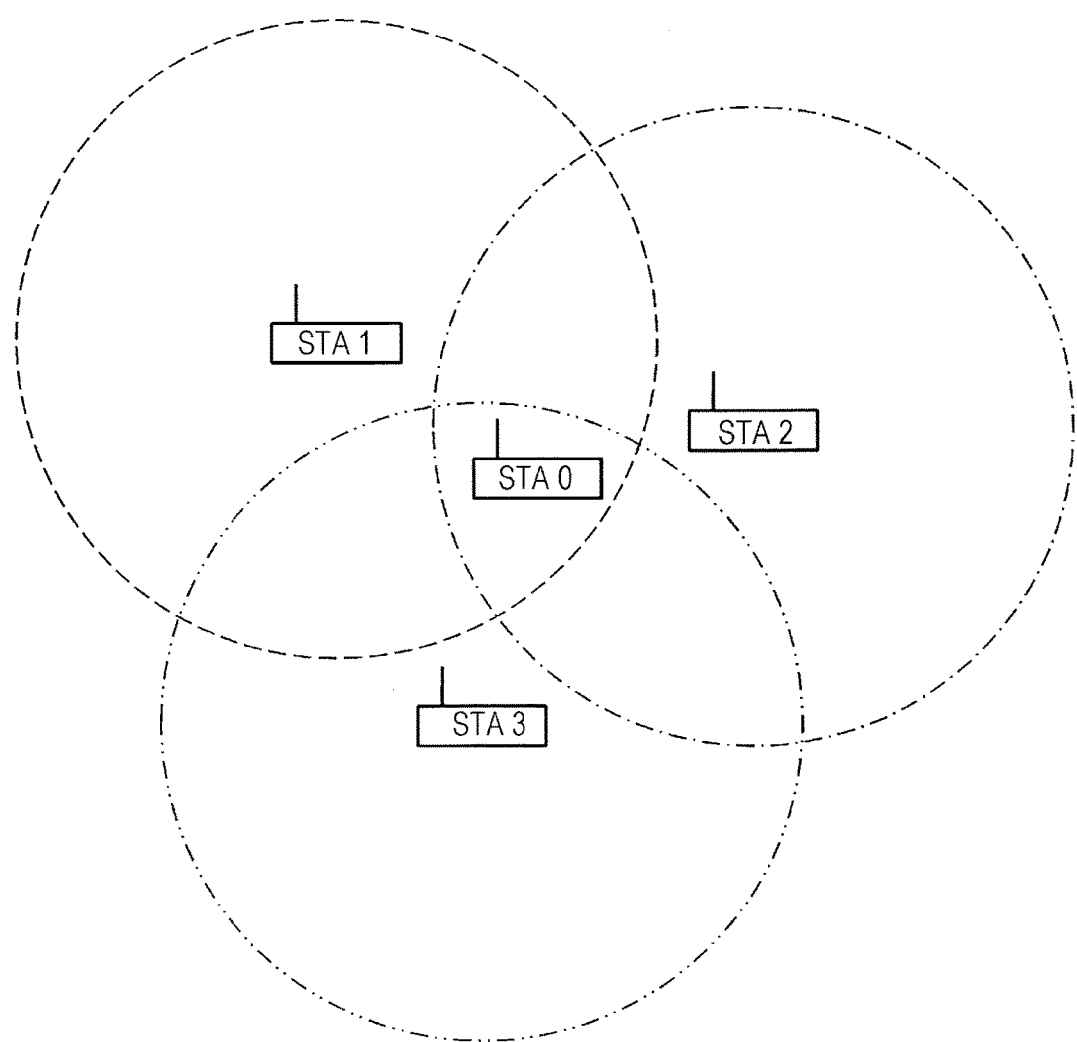
FIG. 1 is a diagram schematically showing a configuration of a communication system according to an embodiment of the present invention.

FIG. 1 schematically shows a configuration of a communication system according to an embodiment of the invention. The communication system according to the embodiment is based on, for example, IEEE 802.11, and also uses RTS/CTS handshake in the procedure of CSMA/CA control.

The communication system shown in the drawing is configured to have a communication station STA0 operating as an access point (AP), and a plurality of communication stations STA1, STA2, and STA3 operating as terminal stations (MT). Each of the communication stations STA1, STA2, and STA3 accommodates the communication station STA0 within each of communication ranges, and can directly communicate with the STA0 (in other words, each of the communication stations STA1, STA2, and STA3 is under control of the STA0 as an access point, constituting a BSS (Basic Service Set)). However, it is not necessary for each of the communication stations STA1, STA2, and STA3 as a terminal station to exist within communication ranges of one another, and direct communication among the terminal stations will not be mentioned below.

Herein, the STA0 as an access point includes a communication device performing Space Division Multiple Access by adaptive array antennas including a plurality of antennas, and multiplexes frame communication by assigning wireless resources on a space axis to a plurality of users. In other words, the STA0 is a communication device based on a novel standard such as IEEE 802.11ac, and performs oneto-multiple frame communication by multiplexing two or more frames with different destined communication stations on the same time axis, or by separating frames, which are multiplexed on the same time axis for transmission by two or more communication stations and destined for the stations themselves, for each transmission source. The STA0 can increase the number of terminal stations that can perform spatial multiplexing, by being equipped with more antennas. Of course, the STA0 can perform not only one-to-multiple frame communication with each of the communication stations STA1, STA2, and STA3 with application of Space Division Multiple Access, but also one-to-one frame communication individually with each of the communication stations STA1, STA2, and STA3.

On the other hand, the communication stations STA1, STA2, and STA3 as terminal stations include a communication device performing SDMA by the adaptive array antennas including a plurality of antennas, but since the stations perform user separation only during reception and do not perform user separation, that is, multiplexing of transmission frame during transmission, it is not necessary to be equipped with the same number of antennas as the number of access points. Furthermore, at least a part of the terminal stations under control of the STA0 as an access point may be a communication device based on the past standard of IEEE 802.11a, or the like. In other words, the communication system shown in FIG. 1 is a communication environment where communication devices with the novel standard coexist with communication devices with the past standard.

Figure 2:
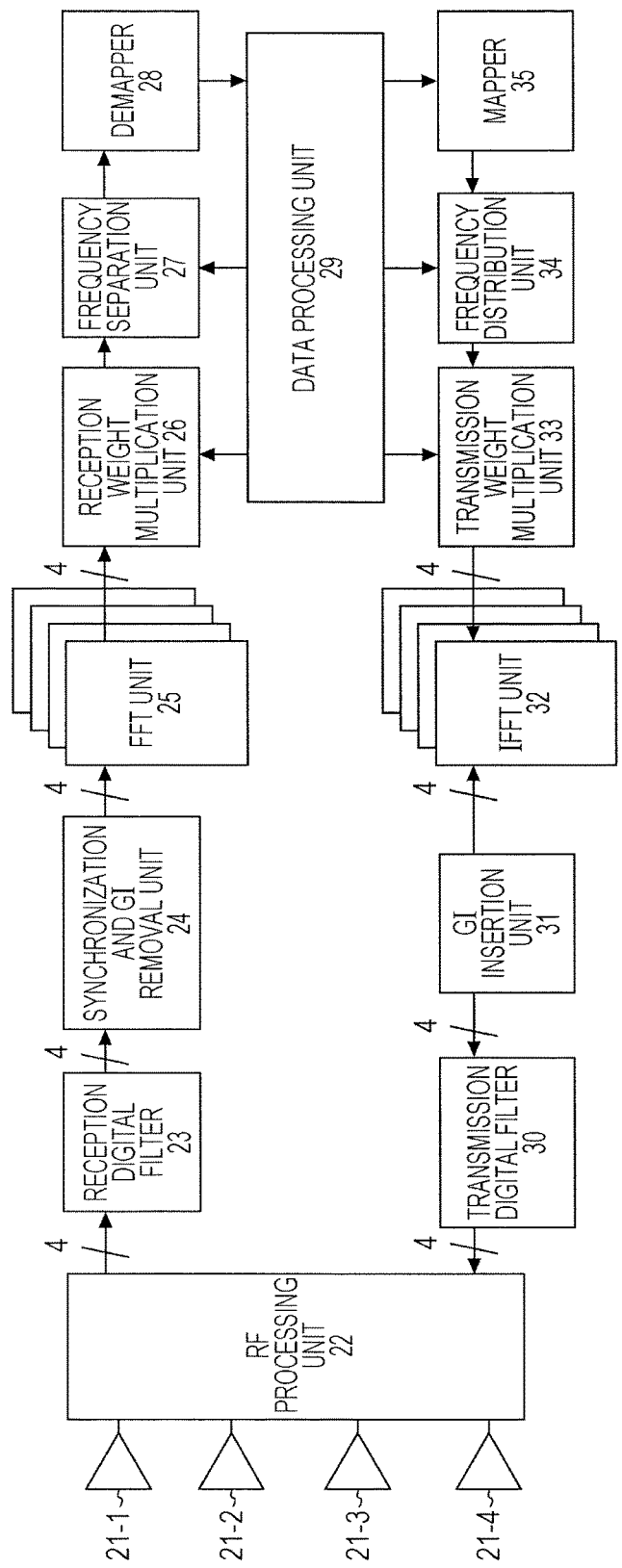
FIG. 2 is a diagram showing a configuration example of a communication device operating as an access point with application of Space Division Multiple Access.

FIG. 2 shows a configuration example of a communication device to which SDMA is applied. In the communication system shown in FIG. 1, the communication terminal STA0 operating as an access point has the configuration shown in FIG. 2, and is assumed to perform a communication operation in compliance with new standards.

The communication device shown in the drawing includes a plurality (four in the example in the drawing) of antenna elements 21-1, 21-2, . . . that realizes an adaptive array antenna function, an RF processing unit 22, a reception processing unit including functional blocks 23 to 28, a data processing unit 29, and a transmission branch including functional blocks 30 to 35. The communication station STA0 as an access point performs SDMA by the adaptive array antennas, but can increase the number of terminal stations to be accommodated with multiple accessing as the station has a large number of antenna elements.

The data processing unit 29 generates transmission data according to transmission requests from superior applications (not shown in the drawing). A mapper 35 sequentially performs mapping for transmission data sequence in a signal space instructed by the data processing unit 29. In the present embodiment, the mapper 35 switches modulation schemes for frames that are spatially multiplexed and destined for each user, following an instruction from the data processing unit 29. The data processing unit 29 determines a modulation scheme adaptively to the communication quality of a channel for each user, and switches a modulation scheme for the purpose of controlling a frame length, but this point will be described later in detail.

A frequency axis assigning unit 34 sequentially assigns the transmission data sequence that underwent mapping to each sub-carrier on a frequency axis. In the embodiment, the frequency axis assigning unit 34 sets respective frequency bandwidths used for frames that are spatially multiplexed and destined for each user, following an instruction from the data processing unit 29. The data processing unit 29 switches the frequency bandwidths for the purpose of controlling a frame length, but this point will be described later in detail.

A transmission weight multiplication unit 33 multiplies the transmission data sequence by a transmission weight, following an instruction from the data processing unit 29, performs spatial separation, and distributes the result to transmission branches of each of the antenna elements 21-1, 21-2, . . . . However, the "spatial separation" during transmission mentioned here is assumed to only mean user separation in which spatial separation is performed for each user who transmits frames at the same time.

An IFFT (Inverse Fast Fourier Transform) unit 32 transforms sub-carriers for each transmission branch arranged in a frequency area into time axis signals, and adds a guard interval in a GI (Guard Interval) insertion unit 31. In addition, the unit restricts a band with a transmission digital filter 30 including an FIR (Finite Impulse Response) filter, or the like, and then, transforms the result to an analog transmission baseband signal.

The RF unit 22 removes a signal component other than a desired band by an analog LPF, and performs up-converting for a desired RF (Radio Frequency) frequency band into the central frequency, and amplifies the signal amplitude by power amplification. In addition, the RF transmission signal of each transmission branch is discharged to the space from each of the antenna elements 21-1, In addition, the RF unit 22 performs low-noise amplification for reception signals from each of the antenna elements 21-1, 21-2, . . . , performs down-converting for the result to analog baseband signals, and transforms the result into digital reception baseband signals.

A reception digital filter 23 includes an FIR filter, or the like, and imposes restriction on a band for digital reception signals. In general communication devices in the reception and transmission sides, a digital filter with the same characteristics is used. A synchronization and GI (Guard Interval) removal unit 24 acquires frame synchronization from the digital reception signal that underwent band restriction, performs frequency offset correction and noise estimation, and removes a guard interval added to the head of a data transmission section. In addition, an FFT (Fast Fourier Transform) unit 25 transforms a time axis signal for each reception branch into a frequency axis signal.

A reception weight multiplication unit 26 multiplies the reception data signal of each reception branch by a reception weight, following an instruction from the data processing unit 29, and performs space separation. However, "space separation" during reception mentioned here is assumed to include both meanings of user separation in which space separation is performed for each user who transmits frames at the same time and channel separation in which a MIMO channel spatially multiplexed is separated into a plurality of original streams.

A frequency separation unit 27 separates the reception data sequence from each sub-carrier on a frequency axis following an instruction from the data processing unit 29. A demapper 28 performs demapping for a signal point in a signal space from the separated reception data sequence and reproduces the original transmission data sequence, following an instruction from the data processing unit 29. The data processing unit 29 transfers the reproduced transmission data to a superior application (not shown in the drawing).

Figure 3:
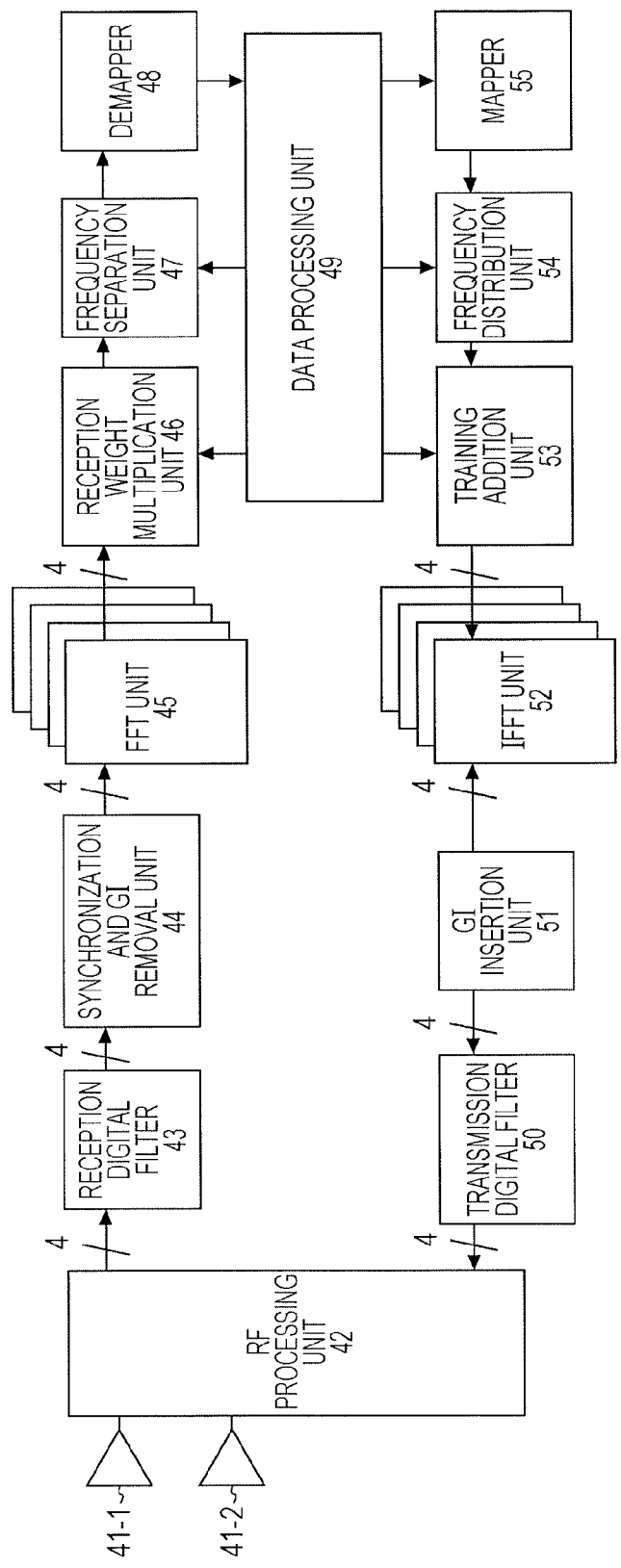
FIG. 3 is a diagram showing a configuration example of a communication device operating as a terminal station with application of Space Division Multiple Access.

FIG. 3 shows another configuration example of the communication device to which SDMA is applied. In the communication system shown in FIG. 1, a station among the communication stations STA1 to STA3 operating as terminal stations corresponding to SMDA has the configuration shown in FIG. 3, and is assumed to perform a communication operation in compliance with new standards.

The communication device shown in the drawing includes a plurality (two in the example shown in the drawing) of antenna elements 41-1 and 41-2 that realizes an adaptive array antenna function, an RF processing unit 42, a reception processing unit including functional blocks 43 to 48, a data processing unit 49, and a transmission branch including functional blocks 50 to 55.

The data processing unit 49 generates transmission data according to transmission requests from superior applications (not shown in the drawing). A mapper 55 sequentially performs mapping for transmission data sequence in a signal space instructed by the data processing unit 49. A frequency axis assigning unit 54 sequentially assigns the transmission data sequence that underwent mapping to each sub-carrier on a frequency axis following an instruction from the data processing unit 49. A training signal addition unit 53 distributes the transmission data sequence to the transmission branch of each antenna elements 41-1 and 41-2 and adds a training signal used in learning the weight of adaptive array antennas to the transmission destination, following an instruction from the data processing unit 49. The training signal includes a known sequence, for example, unique for each of the terminal stations STA1 to STA3.

An IFFT unit 52 transforms a sub-carrier for each transmission branch arranged in a frequency area into a time axis signal, and adds a guard interval to a guard insertion unit 51. In addition, the unit restricts a band on a transmission digital filter 50, and then transforms the result into an analog transmission baseband signal.

The RF unit 42 removes a signal component other than a desired band by an analog LPF, and performs up-converting for a desired RF frequency band into the central frequency, and amplifies the signal amplitude by power amplification. In addition, the RF transmission signal of each transmission branch is discharged to the space from each of the antenna elements 41-1 and 41-2.

In addition, the RF unit 42 performs low-noise amplification for reception signals from each of the antenna elements 41-1 and 41-2, performs down-converting for the result to analog baseband signals, and transforms the result into digital reception baseband signals.

A reception digital filter 43 imposes restriction on a band for digital reception signals. In general communication devices in the reception and transmission sides, a digital filter with the same characteristics is used. A synchronization and guard removal unit 44 acquires frame synchronization from the digital reception signal that underwent band restriction, performs frequency offset correction and noise estimation, and removes a guard interval added to the head of a data transmission section. In addition, an FFT unit 45 transforms a time axis signal for each reception branch into a frequency axis signal.

A reception weight multiplication unit 46 multiplies the reception data signal of each reception branch by a reception weight, following an instruction from the data processing unit 49, and performs space separation. However, "space separation" during reception mentioned here is assumed to include both meanings of user separation in which space separation is performed for each user who transmits frames at the same time and channel separation in which a MIMO channel spatially multiplexed is separated into a plurality of original streams.

A frequency separation unit 47 separates the reception data sequence from each sub-carrier on a frequency axis following an instruction from the data processing unit 49. A demapper 48 performs demapping for a signal point in a signal space from the separated reception data sequence and reproduces the original transmission data sequence, following an instruction from the data processing unit 49. The data processing unit 49 transfers the reproduced transmission data to a superior application (not shown in the drawing).

In the communication system shown in FIG. 1, the STA0 as an access point learns the weight of the adaptive array antennas by acquiring a transfer function between each antenna element included in the adaptive array antenna that the STA0 has and each antenna element that the communication stations STA1 to STA3. Alternatively, the STA0 can learn the weight of the adaptive array antennas using a predetermined adaptive algorithm such as RLS (Recursive Least Square) for a training signal including a known sequence received from the communication stations STA1 to STA3. In addition, the STA0 forms directivity to each of the communication stations STA1 to STA3 based on the weight of the adaptive array antennas learned with either method. Accordingly, the STA0 can perform space separation for transmission frames that are destined for each of the communication stations STA1 to STA3 and are multiplexed on the same time axis, or reception frames that are received from each of the communication stations STA1 to STA3 and are multiplexed on the same time axis, in other words, can realize SDMA in which a plurality of users shares wireless resources on the space axis.

The STA0 as an access point can perform learning of the weight of the adaptive array antennas using, for example, RTS/CTS handshake performed between the communication stations STA1 to STA3 at the same time and in parallel.

Figure 4:
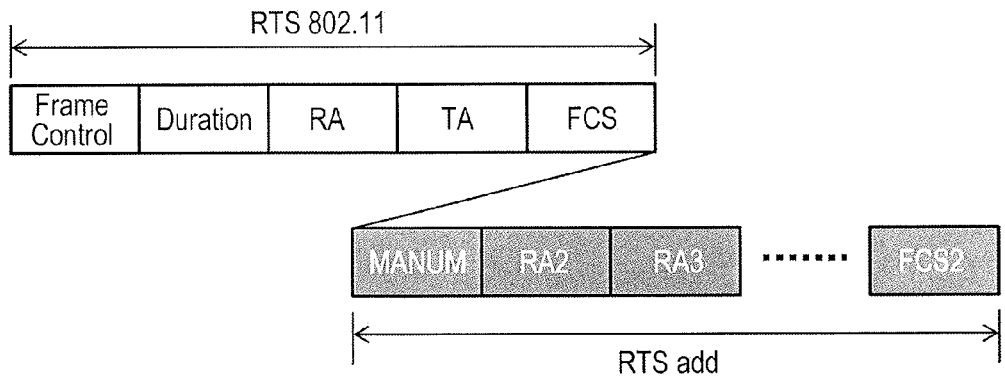
FIG. 4 is a diagram showing an example of the RTS frame format which can be used in learning the weight of adaptive array antennas.
Figure 5:
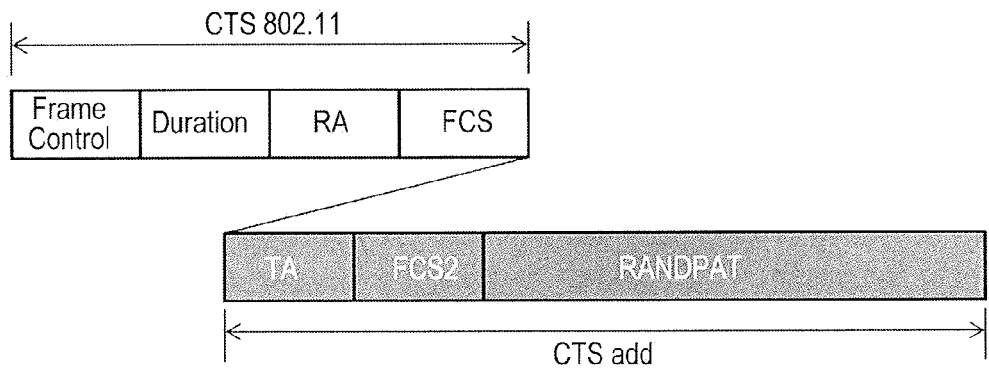
FIG. 5 is a diagram showing an example of the CTS frame format which can be used in learning the weight of adaptive array antennas.
Figure 6:
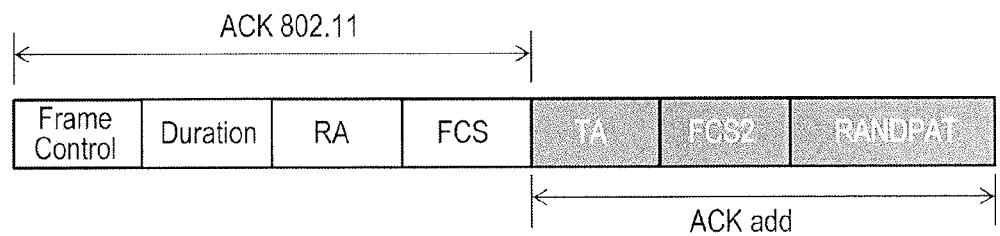
FIG. 6 is a diagram showing an example of the ACK frame format which can be used in learning the weight of adaptive array antennas.

FIGS. 4 to 6 respective show examples of formats of each of RTS, CTS, and ACK frames that can be used in learning the weight of the adaptive array antennas.

The RTS frame format shown in FIG. 4 includes RTS 802.11 that is a field following the past standard of IEEE 802.11 and RTS add that is an additional field following the new standard applied with SDMA (that is, no low-level compatibility with the past standard).

The field (RTS 802.11) following the former past standard in the RTS frame includes a Frame Control constituted by two octets, a Duration constituted by two octets, a Receiver Address (RA) and a Transmitter Address (TA) each of which is constituted by six octets, and a Frame Check Sequence (FCS) constituted by four octets.

The Frame Control has formats further subdivided, and various kinds of information including, for example, the type of frames, the version of a protocol, the presence of retransmission, and information of data route are described therein.

The Duration is provided in order to designate a time. Each communication station that receives the RTS frame can grasp the time to hold a communication operation based on the time described in the Duration when its own address is not described in the Receiver Address (RA). Specifically, a counting value called an NAV (Network Allocation Vector) is set in the Duration.

The address of a communication station that is to be received the corresponding frame is described in the field of the Receiver Address (RA). In addition, the address of a communication station that transmits the corresponding frame is described in the field of the Transmitter Address (TA).

The Frame Check Sequence (FCS) is a 32-bit CRC (Cyclic Redundancy Check). A communication station that has received the corresponding frame re-calculates the Frame Check Sequence to check whether or not both coincide with each other. In addition, when the frame does not coincide with the transmitted Frame Check Sequence, the frame is discarded assuming that the frame is broken, and accordingly, only a right MAC (Media Access Control) frame is recognized to perform a process.

In addition, the field (RTS add) following the latter new standard among the RTS frame includes a MANUM, a plurality of Receiver Addresses (RA2, RA3, . . . ), and a second Frame Check Sequence (FCS2).

In the MANUM, the number of terminals that perform SDMA using the adaptive array antennas is described. In the example of the communication system shown in FIG. 1, the number described in the MANUM is three. As many Receiver Addresses (RA2, RA3, . . . ) as (the number described in the MANUM-1) are provided. In other words, when SDMA is applied, the Receiver Addresses are provided as many as the number of terminal stations that perform SDMA in total in the RTS frame since it is necessary to designate a plurality of destinations in order to demand return of CTS frames to each of the plurality of multiplexing terminal stations. The second Frame Check Sequence (FCS2) is a CRC Check for the field of the RTS add added with the foregoing elements. Furthermore, the reason for providing the Receiver Addresses by the number resulting from subtracting one from the MANUM in the field of the RTS add is that one Receiver Address (RA) has already been included in the field of the RTS 802.11. Alternatively, the Receiver Addresses may be provided by the number of the MANUM in the field of the RTS add, allowing overlapping of the field of the RTS 802.11 and the Receiver Address.

The inclusion of the field of the above-described RTS add following the new standard by the RTS frame shown in FIG. 4 is because, for example, it is necessary for the access point to transmit the RTS frame to the plurality of the terminal stations when SDMA is applied. In addition, the reason for setting the past format in the first half portion and adding new elements to the second half portions is that coexistence with terminals following only the past standard that is not able to understand only the RTS frame of the past is considered.

A terminal station that can understand only the RTS frame of the past format (hidden terminal) can avoid collision with RTS/CTS handshake following the new standard by setting a counting value of NAV based on the Duration and holding a transmission operation for an appropriate period after CRC Check is completed based on the FCS in the field of the RTS 802.11 following the former past standard in the RTS frame.

However, the gist of the invention is not limited to the specific RTS frame format as shown in FIG. 4.

The CTS frame format shown in FIG. 5 includes CTS 802.11 that is a field following the past standard of IEEE 802.11 and CTS add that is an additional field following the new standard applied with SDMA (that is, no low-level compatibility with the past standard). In addition, the ACK frame format shown in FIG. 6 includes ACK 802.11 that is a field following the past standard of IEEE 802.11 and ACK add that is an additional field following the new standard applied with SDMA (that is, no low-level compatibility with the past standard).

The field of CTS 802.11 and the field of the ACK 802.11 following the former past standard include Frame Control constituted by two octets, Duration constituted by two octets, Receiver Address constituted by six octets, and Frame Check Sequence constituted by four octets. The meaning of each element above is the same as that in the field following the past standard in the RTS frame. Among these, the Receiver Address is a copy of a value of the Transmitter Address described in the RTS frame by a communication station that receives the RTS frame destined for the station itself. One difference between the field of the CTS 802.11 of the CTS frame and the field of the ACK 802.11 of the ACK frame from the field of the RTS 802.11 of the RTS frame is that the Transmitter Address is not provided.

In addition, the field of the CTS add following the latter new standard in the CTS frame includes a Transmitter Address (TA), the second Frame Check Sequence (FCS2), and a RANDPAT.

In the Transmitter Address (TA), the address of the transmission source of the CTS frame is described. The second Frame Check Sequence (FCS2) is a CRC Check for the newly added Transmitter Address (TA). The RANDPAT is a random sequence used in learning the weight of the adaptive array antennas, and includes reference information that is unique for each transmission station of the CTS frame (unique sequence) and known for a destination station of the CTS frame performing the learning (in other words, an access point that is the transmission source of the RTS frame). Furthermore, parity checking is not performed for the RANDPAT, which is dependent on the use of the RANDPAT at the physical layer despite the fact of the RANDPAT being defined at the MAC layer.

In addition, the field of the ACK add following the latter new standard in the ACK frame shown in FIG. 6 basically includes a Transmitter Address (TA), a second Frame Check Sequence (FCS2), and an RANDPAT, in the same manner as the field of CTS add of the CTS frame. However, the sequence length of the RANDPAT of the ACK frame can be shortened further than the RANDPAT in the CTS frame since the RANDPAT of the ACK frame has a major objective to make the weight temporarily learned be adapted to environmental changes.

The field of the CTS add shown in FIG. 5 and the field of the ACK add shown in FIG. 6 respectively include the Transmitter Address (TA). This is because, when SDMA is applied, for example, the access point receives a plurality of CTS and ACK frames at the same time, and whereby it is necessary to identify the transmission source of each of the frames (in other words, to specify a terminal station that can obtain a confirmation response). In addition, addition of the field of the CTS 802.11 and the field of the ACK 802.11 following the past format to the first half portion and the new elements of CTS add and ACK add to the second half portion is because coexistence with a terminal that follows only the past standard that understands only the past CTS and ACK frames was considered. The gist of the invention, however, is not limited to the specific frame formats of the CTS and the ACK as shown in FIGS. 5 and 6.

Figure 7:
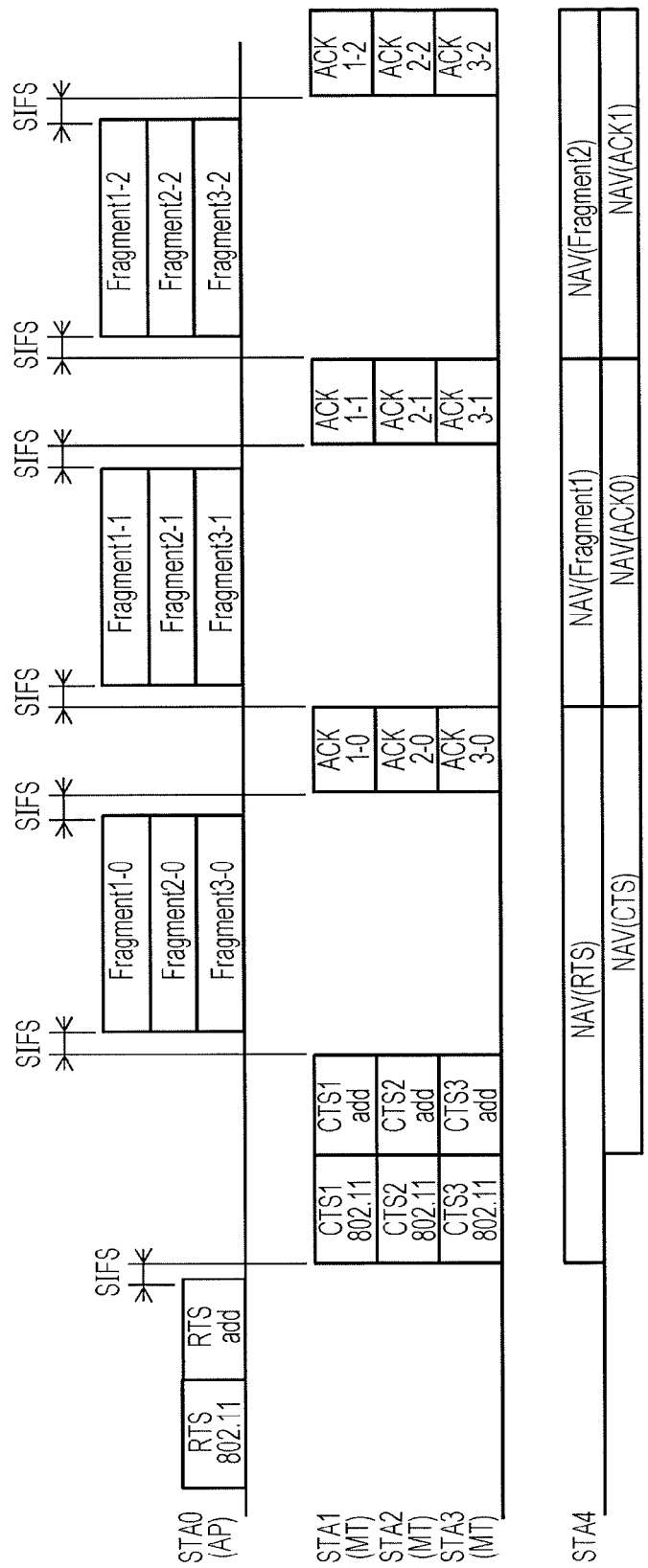
FIG. 7 is a diagram showing an example of a communication sequence in which STA0 as an access point transmits multiplexed frames to communication stations STA1 to STA3 with application of Space Division Multiple Access in the communication system shown in FIG. 1.

FIG. 7 shows an example of a communication sequence in which the STA0 serving as an access point transmits multiplexed frames to the plurality of communication stations STA1 to STA3 with application of SDMA in the communication system shown in FIG. 1. In the example shown in the drawing, the procedure of CSMA/CA that also uses RTS/CTS handshake is implemented, and the frame formats shown in FIGS. 4 to 6 are assumed to be appropriately used. Furthermore, a communication station STA4 in FIG. 7 is not included in FIG. 1, but is a communication station based on the past standard (in other words, a station that is not able to understand each field of the RTS add, CTS add add following the new standard in the frames shown in FIGS. 4 to 6), and is assumed to be a hidden terminal existing within the communication range of at least one of the communication stations STA0 to STA3.

First, the STA0 operating as an access point performs physical carrier sensing in advance, makes sure that a medium is clear, and transmits the RTS frame after further performing back-off. The STA0 transmits the RTS frame with non-directivity since the STA0 has not learned the weight of the adaptive array antennas (in other words, the plurality of antenna elements does not function as adaptive array antennas) at the time to transmit the RTS frame. In the RTS frame, the address of each of the communication stations STA1, STA2, and STA3 that are candidates performing SDMA is described as a Receiver Address (RA, RA2, and RA3).

The STA4 following the past standard sets a counting value of NAV based on information described in the Duration in the first half field of the RTS 802.11 and hold a transmission operation when the STA4 receives the RTS frame that does not include the station itself as a destination.

When each of the communication stations STA1, STA2, and STA3 recognizes that the received RTS frame is destined for its own station, the stations transmit the CTS frame destined for the STA0 that is the transmission source of the RTS frame at the same time after reception of the field of the RTS add is completed and a predetermined frame interval SIFS (Short Inter Frame Space) passes.

After the transmission of the RTS frame is completed, the STA0 waits for reception of the CTS frame returned from each of the destination stations STA1, STA2, and STA3 of the RTS frame. It is necessary for the STA0 to receive a plurality of CTS frames at the same time using any one of the antenna elements since the STA0 has not learned the adaptive array antennas when the CTS frame is to be received. Herein, when the three conditions below are satisfied, the STA0 can receive a plurality of field portions of the CTS 802.11 at the same time, avoiding collision.

(1) To use an OFDM modulation scheme.

(2) To be operated so that the oscillator of each of the communication stations STA1, STA2, and STA3 corrects an error in frequency between the oscillator used in the STA0.

(3) All description in the field of the CTS 802.11 transmitted by each of the communication stations STA1, STA2, and STA3 should be the same.

It is known that the OFDM modulation scheme of Condition (1) is strong for multipath fading. In addition, Condition (2) can be satisfied by executing frequency correction when each of the communication stations STA1, STA2, and STA3 receives the RTS frame from the STA0. By executing frequency correction, it is guaranteed that the delayed time for the CTS frame simultaneously transmitted from each of the communication stations STA1, STA2, and STA3 to reach the STA0 fits into the guard interval. In addition, as shown in Condition (3), if the field of the CTS 802.11 of each of the communication stations STA1, STA2, and STA3 has the same description, the field can be treated the same as general delayed waves, and can be simultaneously received using one antenna element.

Each of the communication stations STA1, STA2, and STA3 respectively transmits the field of the CTS add, successively to the field of the CTS 802.11 including the same description. As shown in FIG. 5, the field of the CTS add is described with the Transmitter Address (TA), and the STA0 can specify each transmission source of the received field of the CTS add. In addition, if the field of the CTS add simultaneously transmitted is received with a plurality of antenna elements, the STA0 learns the weight of the adaptive array antennas using a predetermined adaptive algorithm such as an RLS algorithm based on a known sequence RANDPAT included in each field. Thereafter, the plurality of antenna elements that the STA0 has functions as the adaptive array antennas, and the STA0 can perform SDMA.

On the other hand, when the STA4 following the past standard receives the CTS frame that does not include the station itself as a destination, the STA4 sets a counting value of NAV based on information described in the Duration within the first half field of the CTS 802.11 and holds a transmission operation.

The STA0 transmits each of data frames (Fragment1-0, Fragment2-0, and Fragment3-0) destined for each of the communication stations STA1, STA2, and STA3 after reception of the CTS frame from each of the communication stations STA1, STA2, and STA3 is completed and a predetermined frame interval SIFS passes. The STA0 can perform space division multiplexing the plurality of data frames and simultaneous transmission by using the above-described learned weight of the adaptive array antennas.

When the reception of the data frames (Fragment1-0, Fragment2-0, and Fragment3-0) destined for each of the communication stations STA1, STA2, and STA3 is completed, the stations simultaneously returns ACK frames (ACK1-0, ACK2-0, and ACK3-0) after the predetermined frame interval SIFS passes.

The plurality of antenna elements of the STA0 has already functioned as adaptive antennas, and can perform space separation for the plurality of ACK frames (ACK1-0, ACK2-0, and ACK3-0) simultaneously received. The ACK frames have the frame format shown in FIG. 6, and the STA0 can specify the transmission source of the received ACK frames as the addresses of the communication stations STA1, STA2, and STA3 are respectively described in each Transmitter Address. In addition, the STA0 can make the learned weight of the adaptive array antennas be adaptive to environmental changes using a predetermined adaptive algorithm such as the RLS algorithm based on the RANDPAT included in each of the received ACK frames.

The STA4 following the past standard sets a counting value of NAV based on information described in the Duration and holds a transmission operation when the data frame that is not destined for the station itself is received. In addition, the STA4 following the past standard sets a counting value of NAV based on information described in the Duration and holds a transmission operation when the frame of the above A that is not destined for the station itself is received.

As understood from the communication sequence exemplified in FIG. 7, according to the SDMA method, it is possible to enhance the throughput of the plurality of users as a whole by sharing wireless resources on the space axis between the plurality of users. In addition, in order to further enhance a throughput, a method of expanding a frequency bandwidth can be thought. For example, 20 MHz and 40 MHz bandwidths are used in IEEE 802.11n, but there is a possibility of also using 80 MHz bandwidth in a wireless LAN standard of the next generation.

Figure 8:
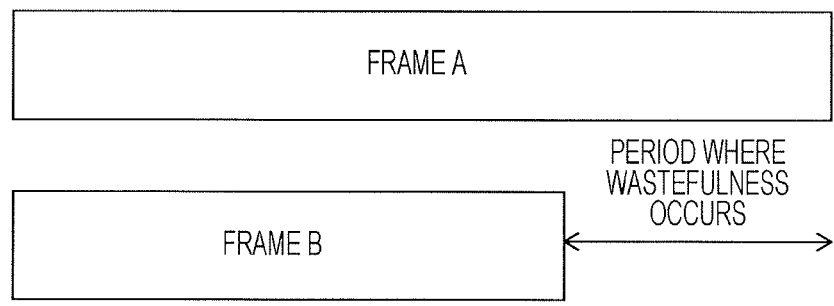
FIG. 8 shows the state where the lengths of a frame A and the frame B multiplexed on the same time axis are different from each other.

A wireless LAN generally adopts a packet communication method, but the amounts of traffic that users want to communicate vary. In addition, there are many cases of performing link adaptation in which a modulation scheme is adaptively switched, in order to guarantee uniform communication quality according to changes in the communication environment. Due to such reasons, a difference in the lengths of packets (frames) occurs. When frames destined for a plurality of users are multiplexed with SDMA and simultaneously transmitted, if a radical change in the total transmission power occurs due to a difference in frame lengths, there is a problem of inducing unstable operations in the reception side (as described above). In addition, if a part of the multiplexed frames ends earlier, and other frames are continuously transmitted, a communication-possible band cannot be effectively used, and accordingly, the effect of SDMA diminishes. In the example shown in FIG. 8, the state where the lengths of a frame A and a frame B multiplexed on the same time axis are different from each other is shown. In the example shown in the drawing, it can be understood that the length of the frame B is short, and a communication-possible band after the end of transmission of the frame B is wasted.

For this reason, it is necessary to transmit the frames multiplexed on the same time axis with the same frame length at the final even if the lengths of transmission data for each user vary.

A method is considered in which padding is performed for a frame with a short length among a plurality of frames spatially multiplexed to match with a frame with a long length, but embedding meaningless data in a payload, or the like leads to a waste of bands.

In addition, in a case of the same number of information bits, a frame length is shortened with switching to a modulation scheme having a large number of states such as 64-QAM (Quadrature Amplitude Modulation) and 256-QAM, and a frame length is lengthened with switching to a modulation scheme having a small number of states such as BPSK (Binary Phase Shift Keying) and QPSK (Quadrature PSK). If a modulation scheme is switched according to the amount of traffic, it is easily understood that the lengths of a plurality of frames destined for each of users can be uniformized. However, if a modulation scheme for each frame is determined so as to uniformize the lengths of frames multiplexed, whereas a modulation scheme should be determined in order to uniformize link adaptation, that is, the communication quality, the communication quality becomes non-uniform. For example, when a modulation scheme with a small number of states is selected in order to lengthen a frame length, a modulation scheme with excessive safety rather than with good quality of communication traffic is used, thereby increasing waste.

On the other hand, when frames with different frequency bandwidths exist, if frames are sorted by each bandwidth of 20 MHz, 40 MHz, and 80 MHz and frames with the same frequency bandwidth are to be multiplexed, a chance to multiplex and transmit frames of a bandwidth with a small number of frames is lessened, and accordingly, a decrease in throughput is likely to be caused.

Thus, the inventors consider both problems of a modulation scheme and a frequency bandwidth, and propose a method of uniformizing the lengths of frames multiplexed on the same time axis as follows.

When the frequency bandwidth of 20 MHz is used, only half of the data amount can be transmitted in comparison to a case where the frequency bandwidth of 40 MHz is used. In the same manner, when the frequency bandwidth of 40 MHz is used, only half of the data amount can be transmitted in comparison to a case where the frequency bandwidth of 80 MHz is used. Table 1 below shows ratios of the data amounts of which data can be transmitted with each modulation scheme and frequency bandwidth. In addition, Table 2 shows ratios of frame lengths of which frames are transmitted with each modulation scheme and frequency bandwidth. If a bandwidth is extended with the same modulation scheme, the ratio of frame lengths increases, and therefore, deterioration of the communication quality in switching of a bandwidth should be sufficiently considered.

TABLE 1

|  | 20 MHz | 40 MHz | 80 MHz |
|---|---|---|---|
| BPSK | 1 | 2 | 4 |
| QPSK | 2 | 4 | 8 |
| 16QAM | 4 | 8 | 16 |
| 64QAM | 6 | 12 | 24 |
| 256QAM | 8 | 16 | 32 |

TABLE 2

|  | 20 MHz | 40 MHz | 80 MHz |
|---|---|---|---|
| BPSK | 32 | 16 | 8 |
| QPSK | 16 | 8 | 4 |
| 16QAM | 8 | 4 | 2 |
| 64QAM | 5.3333 | 2.6666 | 1.3333 |
| 256QAM | 4 | 2 | 1 |

For example, there are two methods of lengthening the length of the frame A by setting a 40 MHz bandwidth as a reference at first, and converting into 40 MHz bandwidth, according to the communication quality of a channel through which the frame A is transmitted, as follows.

(1) When the communication quality of a channel through which the frame A is transmitted is high:

First, since transmission in 20 MHz band approximately halves a transmittable amount of data, a frame length can be doubled. When a frame length becomes rather excessively long as a result of narrowing the frequency bandwidth, the communication quality of a channel is high, and therefore, it is possible to shorten the frame length by switching to a modulation scheme with the greater number of states.

(2) When the communication quality of a channel through which the frame A is transmitted is low:

First, it is possible to lengthen a frame length by converting to a modulation scheme with the smaller number of states. Nevertheless, when the frame length is still short in comparison to other multiplexed frames, it is possible to lengthen the frame length by converting the frequency bandwidth from 40 MHz band to 20 MHz band.

Figure 9:
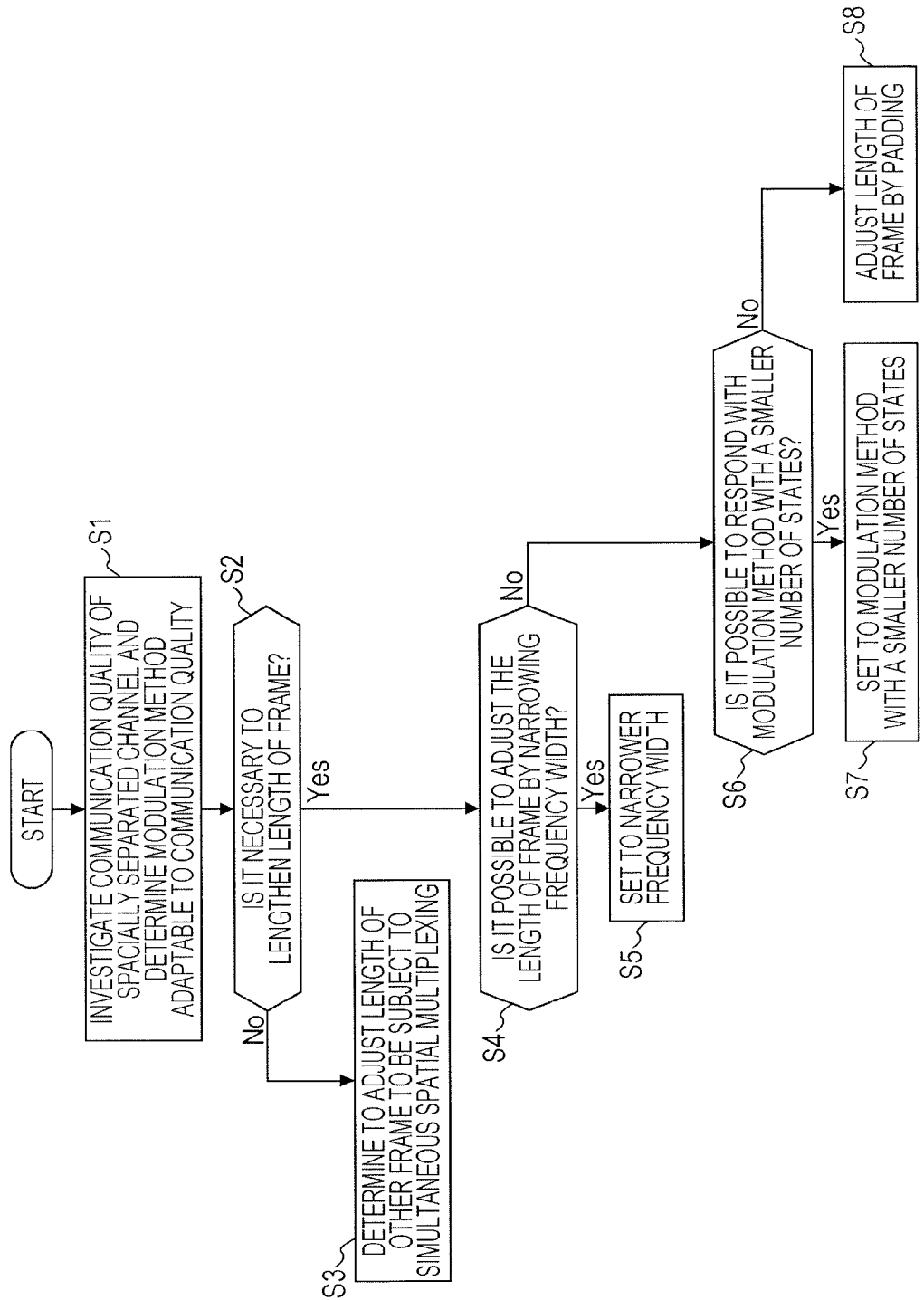
FIG. 9 is a flowchart of a procedure for performing control of a frame length by a communication device performing Space Division Multiple Access by combining a frequency bandwidth and a modulation scheme.

FIG. 9 shows a procedure for performing control of a frame length of each frame spatially multiplexed in a way that the communication device performing SDMA combines a frequency bandwidth and a modulation scheme, in the form of flowchart.

The modulation scheme and the frequency bandwidth of a frame as a control target are set by those of a frame with the shortest frame length as the initial setting of the procedure in the drawing.

First, the communication quality of each channel subjected to space separation for each user that is the transmission destination of frames is examined to determine a modulation scheme according to the communication quality (Step S1). For example, the modulation scheme appropriate for the communication quality of the channel is set to 16-QAM.

Next, conversion is performed into a frame length in the maximum frequency bandwidth of 80 MHz by the modulation scheme of the channel set in the above-described Step S1 referring to Table 2 above to check whether or not it is necessary to further lengthen the frame length (Step S2).

Herein, when it is determined that the frame length is not necessary to be lengthened further, in other words, it is desired that the frame length is shortened (No in Step S2), it is not possible to shorten the frame length by further extending the frequency bandwidth, nor is it preferable to switch to a modulation scheme with the greater number of states due to deterioration in the communication quality. Thus, instead of the corresponding frame, it is determined to adjust the length of other frame spatially multiplexed with the frame (Step S3).

On the other hand, when it is determined to further lengthen the frame length (Yes in Step S2), subsequently, it is checked whether or not the frame length can be controlled by narrowing the frequency bandwidth of the frame (Step S4).

When the frequency bandwidth of the frame can be further narrowed (Yes in Step S4), the frequency bandwidth is set to 20 MHz or 40 MHz narrower than 80 MHz of the initial setting (Step S5). Furthermore, when the lengths of multiplexed frames does not coincide with each other even in the setting to either narrow frequency bandwidth, the lengths can be uniformized by performing padding for a shorter frame.

In addition, when it is not possible to narrow the frequency bandwidth of the frame any more (No in Step S4), subsequently, it is checked whether or not the frame length can be controlled by switching to a modulation scheme with the smaller number of states (Step S6). However, an allowable range for switching the modulation scheme is set to two stages. This is because, if switching is performed to a modulation scheme with a small number of states of three or higher stages, a modulation scheme with excessive safety rather than with good quality of communication traffic is used, thereby increasing waste.

In addition, if the frame length can be controlled by switching to a modulation scheme with the smaller number of states (Yes in Step S6), switching is performed to a modulation scheme with the even smaller number of states in the range within two stages (Step S7). For example, if the current modulation scheme is 16-QAM, switching can be performed to QPSK or BPSK.

In addition, when it is not possible to respond to control of a frame length even if switching is already performed to a modulation scheme with the smaller number of states (No in Step S6), padding is performed for the frame and the length is adjusted so as to have a desired frame length (Step S8).

Furthermore, in the embodiment shown in FIG. 9, it is assumed that control is performed only to the direction to lengthen the frame length, and not to the direction to shorten. When a plurality of frames is to be spatially multiplexed, the communication device can exert all the power to coincide the lengths of each frame by sequentially applying the process shown in FIG. 9 to each transmission frame.

As above, the degree of freedom in controlling a frame length increases by combining the frequency bandwidth and the modulation scheme, efficient space division multiple communication can be performed by uniformizing the lengths of multiplexed frames.

Figure 10:
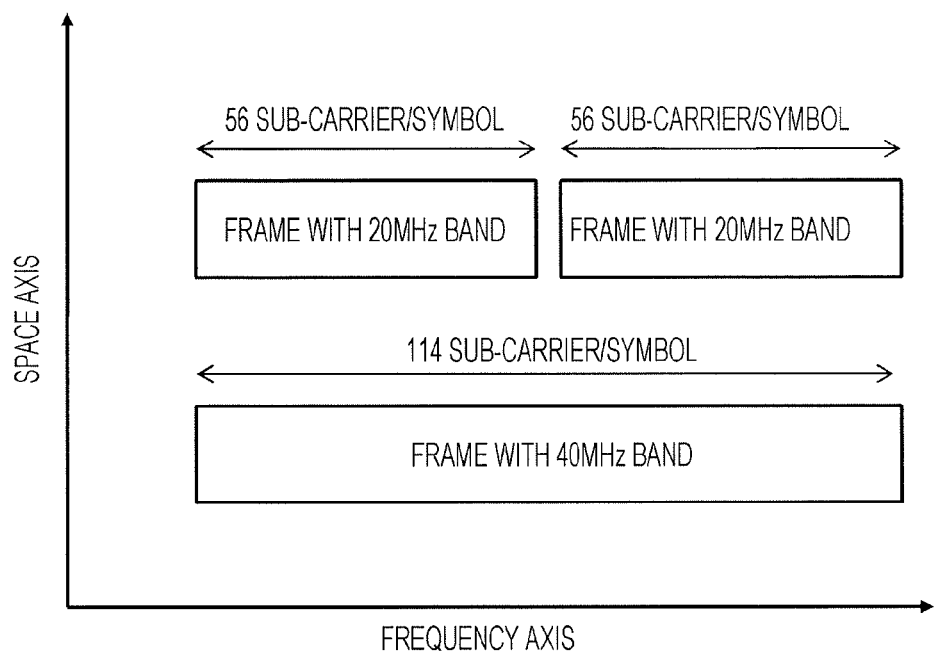
FIG. 10 is a diagram exemplifying the state where frames with different frequency bandwidths are multiplexed on a space axis.

FIG. 10 exemplifies the state where frames with a different frequency bandwidth are multiplexed on the space axis. In the same drawing, the horizontal axis represents a frequency axis and the vertical axis represents a space axis. Whereas one OFDM symbol in the 40 MHz band includes 114 sub-carriers, one OFDM symbol in the 20 MHz band includes 56 sub-carriers, which are about a half of those in 40 MHz. Therefore, as shown in the drawing, the bandwidth of one frame in 40 MHz and the bandwidth of two frames in 20 MHz are substantially the same, being used in multiplexing on the space axis. In other words, it is possible to realize efficient communication by multiplexing two streams on the space axis.

In addition, in order to realize SDMA under a communication environment where a plurality of frequency bands of 20 MHz, 40 MHz, and 80 MHz coexist in a wireless LAN, it is necessary to realize collision avoidance over the entire used frequency band.

In many wireless LAN systems beginning from IEEE 802.11a and IEEE 802.11n, collision avoidance is achieved by adopting an access control procedure based on carrier sense such as CSMA/CA (Carrier Sense Multiple Access with Collision Avoidance). As another methodology for solving the problem of a hidden terminal, "virtual carrier sense" based on RTS/CTS handshake is also used.

A signal transmission and reception sequence of RTS/CTS handshake is as shown in FIG. 7. In regard to a so-called hidden terminal, it is possible to avoid collision with RTS/CTS handshake by holding a transmission operation for a proper period after setting a counting value of NAV based on the Duration of a reception frame (RTS, CTS, DATA, ACK, or the like) that is not destined for the station itself.

Under a communication environment where a plurality of frequency bands coexist as described above, it is necessary to secure a band by appropriately setting a counting value of NAV in a hidden terminal over the entire using frequency bands.

Basically, each communication station can receive frames within a range of its own using frequency band, but is not able to receive frames over its using frequency band. Specifically, a communication terminal using the 20 MHz band can receive only frames of the same 20 MHz band. A communication terminal using 40 MHz band can receive frames of 20 MHz, but is not able to receive frames of 80 MHz. In addition, a communication terminal using 80 MHz band can receive any frames of 40 MHz and 20 MHz.

Figure 11:
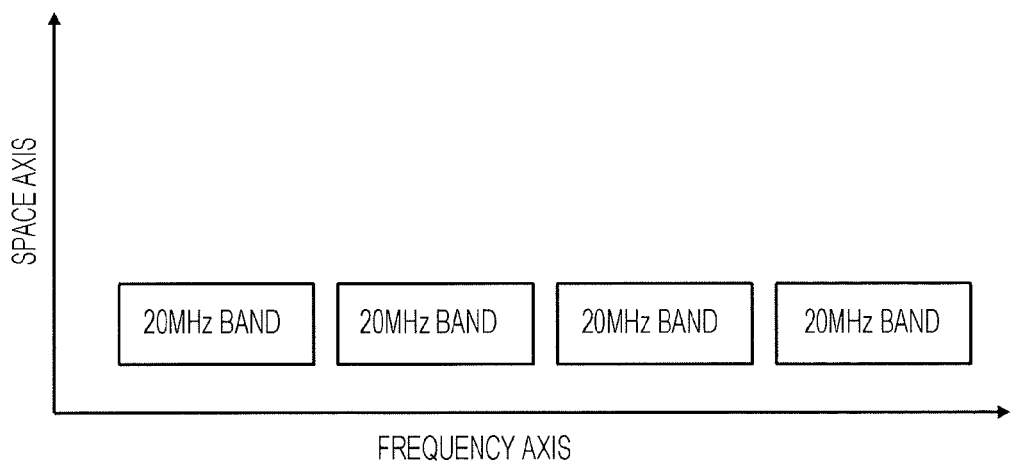
FIG. 11 is a diagram showing the state where 20 MHz is transmitted in four duplicate modes (frequency bands used in transmitting RTS 802.11, RTS add, and CTS 802.11) using 80 MHz band.

Thus, as shown in FIG. 11, each frame of RTS and CTS (the portion of the field of RTS 802.11 and of CTS 802.11 following the past standard) is transmitted in four duplicate modes of 20 MHz using 80 MHz in RTS/CTS handshake.

In the example of the communication sequence shown in FIG. 7, the communication station STA0 operating as an access point transmits RTS frames, but it can be expected that the station has capability to transmit frames in four duplicate modes as shown in FIG. 11. On the other hand, the plurality of communication stations STA1, STA2, . . . operating as terminal stations returns CTS frames, but it is not limited that all the terminal stations possesses capability to transmit frames in four duplicate modes. Each of the communication stations STA1, STA2, . . . is assumed to return the CTS frames in its own capable bandwidth (or, in the original bandwidth where data frames are received).

When the number of channels of 20 MHz bandwidth is four channels and SDMA is performed simultaneously using each frequency bandwidth of 20 MHz, 40 MHz, and 80 MHz, the field described with the Duration of each frame of CTS and RTS is transmitted using four band of 20 MHz bandwidth (in other words, in four duplicate modes) as shown in FIG. 11. Accordingly, even a communication station that can receive frames only in one of the four bands, that is 20 MHz bandwidth, can receive frames in the using band and appropriately set a counting value of NAV. The example shown in FIG. 11 is a frequency used when each field of RTS 802.11, RTS add, and CTS 802.11 is transmitted.

Figure 12:
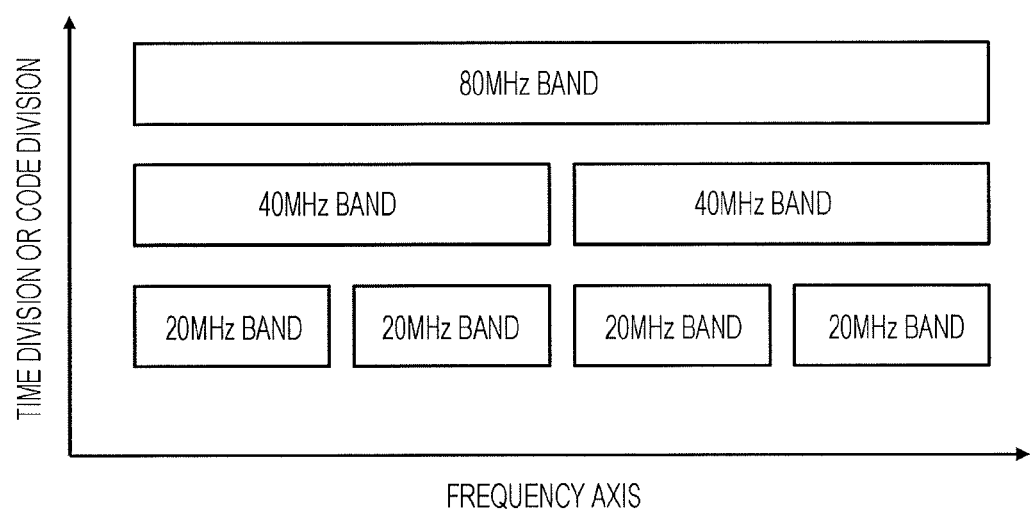
FIG. 12 is a diagram showing frequency bands used in transmitting a CTS add field (and data frames and ACK frames).

In addition, FIG. 12 shows a frequency used when the field of CTS add is transmitted. The field of CTS add includes a known sequence of RANDPAT used in learning of adaptive array antennas in the CTS frame reception side (as described above). It is necessary for an RTS reception station to learn the adaptive array antennas from the received field of CTS add in a frequency band used during transmission of data frames. Thus, a CTS transmission station transmits the field of CTS add in a frequency band used during communication of data packets. If an RTS reception station communicating the data packets of 80 MHz receives the RTS frames transmitted in the four duplicate modes as shown in FIG. 11, the station transmits the field of CTS add using the 80 MHz band. In addition, transmission of the field of CTS add is performed in 40 MHz by an RTS reception station communicating data packets in 40 MHz, and in 20 MHz by an RTS reception station communicating data packets in 20 MHz.

As shown in FIG. 12, it is possible to multiplex two fields of CTS add in a lower 40 MHz band and an upper 40 MHz band by frequency division. In addition, it is possible to multiplex three fields of CTS add in two duplicate modes obtained by dividing the upper 40 MHz band into 20 MHz bands, together with the lower 40 MHz band by frequency division. In addition, it is possible to multiplex by frequency division four fields of CTS add in four duplicate modes as a whole by dividing each of the upper 40 MHz band and the lower 40 MHz band into 20 MHz bands.

In the example shown in FIG. 12, a CTS reception station (that is, an access point transmitting RTS frames) is required to include antenna elements as many as the elements can perform spatial multiplexing for four streams at the maximum with the same frequency and at the same time. Fields of CTS add including signals for training are returned at the same time from maximum 10 RTS reception stations. In other words, it is possible to spatially multiplex four fields of CTS add (by time division or code division), but it is possible to perform learning of adaptive array antennas with partners of a maximum of ten users, together with the frequency direction.

In addition, when an RTS transmission station that received CTS frames transmits data frames thereafter, the station may multiplex data frames destined for a plurality of users with the same frequency configuration as in FIG. 12. Subsequently, when a CTS transmission station that received the data frame returns ACK frames, the station may transmit the frames in the entire 20 MHz included in a using frequency bandwidth.

Figure 13A:
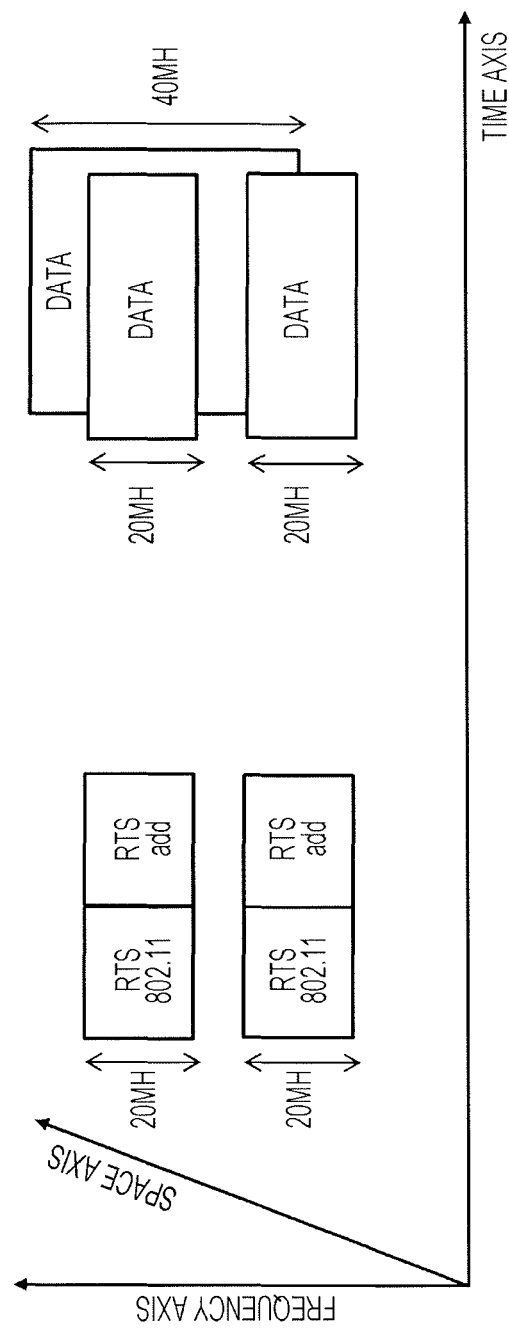
FIG. 13A is a diagram showing an example of a signal transmission and reception sequence of an access point (AP) serving as an RTS transmission source in RTS/CTS handshake using the frequency configuration shown in FIGS. 11 and 12.
Figure 13B:
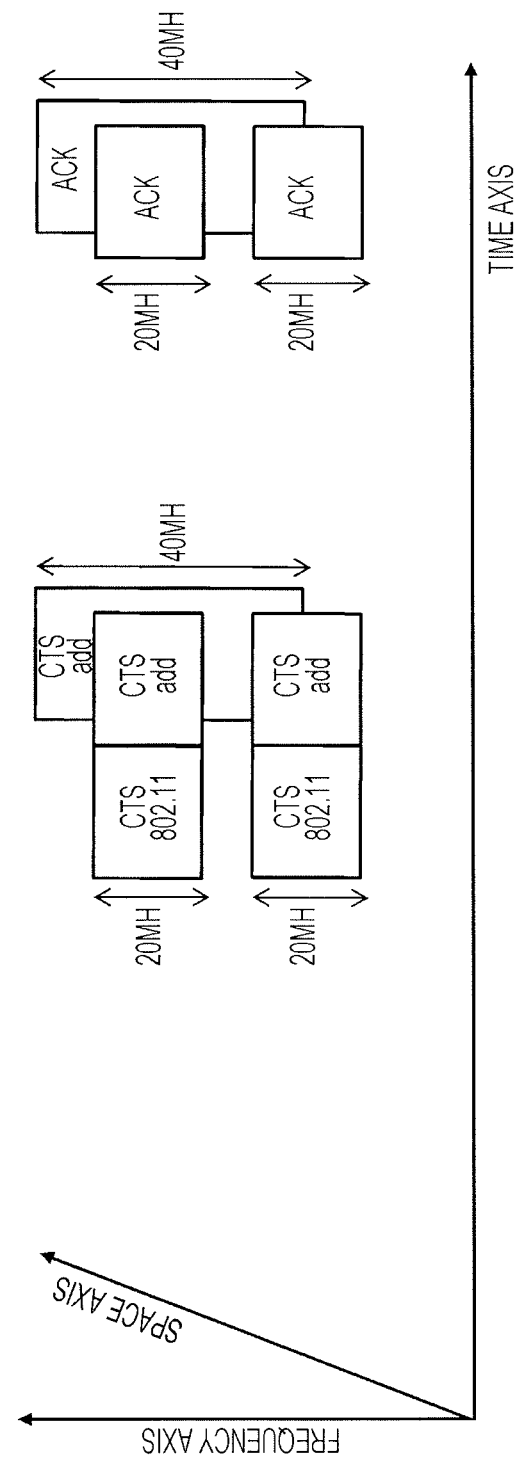
FIG. 13B is a diagram showing an example of a signal transmission and reception sequence of a terminal state (STA) serving as an RTS reception side in RTS/CTS handshake using the frequency configuration shown in FIGS. 11 and 12.

Using the frequency configuration shown in FIGS. 11 and 12, it is possible to perform RTS/CTS handshake between the access point (AP) that is the RTS transmission source and a terminal station (STA) that is the RTS reception side. FIGS. 13A and 13B respectively show examples of a signal transmission and reception sequence of the access point (AP) that is the RTS transmission source and a terminal station (STA) that is the RTS reception side. In each drawing, however, for simplification of drawings, it is assumed that only either upper or lower 40 MHz bands and two 20 MHz bands included in the 40 MHz band are used.

Figure 14:
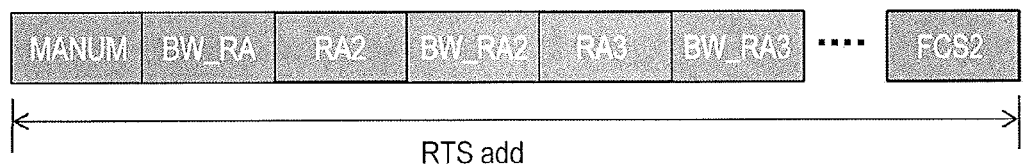
FIG. 14 is a diagram showing a modification of the RTS frame format.

FIG. 14 shows a modified example of the RTS frame format. The field of RTS 802.11 is the same as the example of the frame format shown in FIG. 4. The field of RTS add differs from that in FIG. 4 in that the field further includes BW RA, BW RA1, . . . designating a usage bandwidth (BW) for each transmission destination of the RTS frames (in other words, Transmitter Address). Thus, according to the frame format shown in FIG. 14, the access point transmitting the RTS frames can designate the using bandwidth for each terminal station that is the transmission destination of multiplexed frames.

The access point checks that a medium is clear by performing physical carrier sensing in advance, and further performs back-off. After that, the RTS frames are transmitted using two bands of the 20 MHz bandwidth (in other words, in two duplicate modes). Accordingly, even a communication station that can receives frames only in one 20 MHz bandwidth out of two bands performs frame reception in the using band, and can appropriately set a counting value of NAV.

After a terminal station STA that is a destination station of the RTS frames completes reception of the RTS frames and a predetermined frame interval SIFS passes, the station returns CTS frames in a bandwidth designated for RTS add. In other words, when the STA operates in either upper or lower 20 MHz bandwidth, the station returns the field of CTS 802.11 and the following field of CTS add in the 20 MHz band. In addition, when the STA operates using two bands of 20 MHz bandwidth (in other words, in two duplicate modes), the station returns the field of CTS 802.11 and the following field of CTS add in two duplicate modes of 20 MHz bandwidth. In addition, when the STA operates in 40 MHz bandwidth, the stations first returns the field of CTS 802.11 in two duplicate modes of 20 MHz bandwidth, and successively returns the field of CTS add in the 40 MHz bandwidth.

Figure 15:
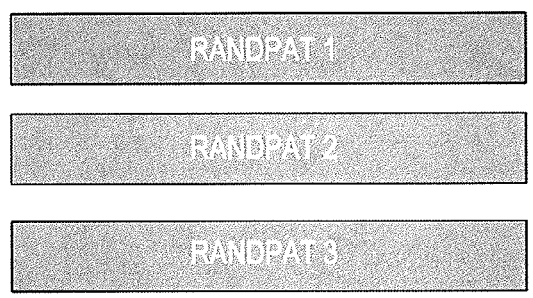
FIG. 15 is a diagram showing the state where a plurality of CTS transmission stations transmits the CTS add field including RANDPAT at the same time point.

The field of CTS 802.11 among the CTS frames may have the same the frame format as shown in FIG. 5. In addition, the field of CTS add including RANDPAT that is a learning signal of the adaptive array antennas is transmitted by each terminal station with time division or at the same time point as shown in FIG. 15.

The access point learns the weight of the adaptive array antennas using the known learning sequence in the CTS add frame received from the terminal station. Then, after the access point received the CTS frames from each terminal stations STA and the predetermined frame interval SIFS passes, the access point starts transmitting data frames. The frequency bandwidth to be used for the data frames destined for each terminal station is designated in the field of RTS add, and the access point appropriately multiplexes the data frames destined for the plurality of terminal stations in the directions of the space axis and the frequency axis for transmission.

The terminal stations wait to receive the data frames in the frequency band designated in the field of RTS add. Then, the terminal stations return ACK frames in the bandwidth designated for RTS add after the data frames are received and the predetermined frame interval SIFS passes. In other words, the STA returns the ACK frame in the 20 MHz band when the STA operates in either upper or lower 20 MHz bandwidth. In addition, when the STA operates using two bands of the 20 MHz bandwidth (in other words, in two duplicate modes), the STA returns the ACK frames in two duplicate modes of the 20 MHz bandwidth. In addition, when the STA also operates in the 40 MHz bandwidth, the STA returns the ACK frames in two duplicate modes of the 20 MHz bandwidth.

Furthermore, in the signal transmission and reception sequences shown in FIGS. 13A and 13B, the data frames and ACK frames can use a frame format freely defined. The reason is that a hidden terminal is forced to hold a transmission operation by setting a counting value of NAV based on the Duration of RTS 802.11 and CTS 802.11.

According to the invention as above, it is possible to efficiently perform spatial multiplexing for stream channels from a plurality of users and a simultaneous operation of communication devices that do not correspond to SDMA but follow the past standard is also possible under the wireless LAN environment as shown in FIG. 1.

INDUSTRIAL APPLICABILITY

Hereinabove, the present invention was described in detail with reference to specific embodiments. However, it is obvious that a person in the related art can attain correction or substitution of the embodiments within a range not departing from the gist of the invention.

In the present specification, an embodiment that is applied to a novel wireless LAN standard such as IEEE 802.11ac that aims to realize ultrahigh throughput of 1 Gbps was mainly described, but the gist of the invention is not limited thereto. For example, the invention can be applied in the same manner also to other wireless LAN system or various wireless systems other than a LAN in which wireless resource are shared by a plurality of users on the space axis.

In short, the invention is disclosed in the forms of exemplification, and description in the present specification should not be limitedly interpreted. The claims of the invention should be considered in order to determine the gist of the invention.

REFERENCE SIGNS LIST 21 antenna element
22 RF unit
23 reception digital filter
24 synchronization and GI removal unit
25 FFT unit
26 reception weight multiplication unit
27 frequency separation unit
28 demapper
29 data processing unit
30 transmission digital filter
31 GI insertion unit
32 IFFT unit
33 transmission weight multiplication unit
34 frequency assigning unit
35 mapper
41 antenna element
42 RF unit
43 reception digital filter
44 synchronization and GI removal unit
45 FFT unit
46 reception weight multiplication unit
47 frequency separation unit
28 demapper
49 data processing unit
50 transmission digital filter
51 GI insertion unit
52 IFFT unit
53 training signal addition unit
54 frequency assigning unit
55 mapper

The invention claimed is:

1. A communication device comprising:
a Space Division multiplexing unit configured to assign wireless resources on a space axis to a plurality of users for spatially multiplexing, and to transmit spatially multiplexed frames through a plurality of adaptive array antennas;
a frequency bandwidth setting unit configured to set a frequency bandwidth for the plurality of adaptive array antennas;
a modulation and demodulation unit configured to modulate and demodulate the spatially multiplexed frames; and
a data processing unit configured to process frames for each of the plurality of users and determine both a modulation scheme applied in the modulation and demodulation unit and the frequency bandwidth set in the frequency bandwidth setting unit,
wherein the frequency bandwidth setting unit sets a minimum frequency bandwidth at a plurality of positions over whole usable frequency bands and sets a frequency band obtained by setting two or more minimum frequency bands,
wherein when the frequency bandwidth is configured to include two or more minimum frequency bandwidths, a transmission requested (RTS) frame is transmitted from each of the minimum frequency bandwidths, and a checking notification (CTS) frame is configured to be received in at least one channel of the two or more minimum frequency bandwidths even when other minimum frequency bandwidths cannot be used, and if all the minimum frequency bandwidths can be used, the CTS frame is received from each of the two or more minimum frequency bandwidths,
wherein CTS frames are received, from other communication devices of the plurality of users that have received the transmitted RTS frame, for each of the minimum frequency bandwidths in which the RTS frame is transmitted that can be used by each respective one of the other communication devices,
wherein the data processing unit is further configured to adaptively determine the modulation scheme for the at least one channel based on a communication quality of the at least one channel,
wherein a frame length for transmission of spatially multiplexed frames on the at least one channel is controlled according to the determined modulation scheme of the at least one channel, and
wherein the Space Division multiplexing unit, the frequency bandwidth setting unit, the modulation and demodulation unit, and the data processing unit are each implemented via at least one processor.

2. The communication device according to claim 1, wherein the frequency bandwidth is configured to include an even number of the minimum frequency bandwidths.

3. The communication device according to claim 1, wherein the data processing unit is further configured to generate each transmitted RTS frame including a standard field of RTS 802.11 and a field of RTS add that describes the frequency bandwidth and a frequency position used in the spatially multiplexed transmission frames for each of the plurality of users.

4. A communication method, performed via at least one processor, the method comprising:
assigning wireless resources on a space axis to a plurality of users and spatially multiplexing frames;
transmitting the spatially multiplexed frames through a plurality of adaptive array antennas;
setting a minimum frequency bandwidth for the plurality of adaptive array antennas at a plurality of positions over whole usable frequency bands;
setting a frequency band obtained by setting two or more minimum frequency bands; and modulating and demodulating the spatially multiplexed frames according to a determined modulation scheme, wherein when the frequency bandwidth is configured to include two or more minimum frequency bandwidths, a transmission requested (RTS) frame is transmitted from each of the minimum frequency bandwidths, and a checking notification (CTS) frame is configured to be received in at least one channel of the two or more minimum frequency bandwidths even when other minimum frequency bandwidths cannot be used, and if all the minimum frequency bandwidths can be used, a CTS frame is received from each of the minimum frequency bandwidths, and wherein CTS frames are received, from communication devices of the plurality of users that have received the transmitted RTS frame, for each of the minimum frequency bandwidths in which the RTS frame is transmitted that can be used by each respective one of the communication devices, wherein the modulation scheme is adaptively determined for the at least one channel based on a communication quality of the at least one channel, and wherein a frame length for transmission of spatially multiplexed frames on the at least one channel is controlled according to the determined modulation scheme of the at least one channel.

5. A communication system in which wireless resources are assigned on a space axis to a plurality of users for spatially multiplexing, spatially multiplexed frames are transmitted through a plurality of adaptive array antennas, a minimum frequency bandwidth can be configured to be set for the plurality of adaptive array antennas at a plurality of positions over whole usable frequency bands, and a frequency band obtained by setting two or more minimum frequency bands can be set, the communication system comprising:

a first communication device which is configured to
    transmit a transmission requested (RTS) frame from each of the minimum frequency bandwidths when the frequency bandwidth includes two or more minimum frequency bandwidths,
    receive a checking notification (CTS) frame in the at least one channel of the two or more minimum frequency bandwidths even when other minimum frequency bandwidths cannot be used,
    receive the CTS frame in each channel of the two or more minimum frequency bandwidths if all the minimum frequency bandwidths can be used, and
    modulate and demodulate the spatially multiplexed frames according to a modulation scheme; and a plurality of second communication devices each associated with a respective station and each configured to receive the RTS frame destined for the respective station and to return the CTS frame for each of the minimum frequency bandwidths in which the RTS frame is transmitted that can be used by the respective station, wherein the modulation scheme is adaptively determined for the at least one channel based on a communication quality of the at least one channel, and wherein a frame length for transmission of spatially multiplexed frames on the at least one channel is controlled according to the determined modulation scheme of the at least one channel.

* * * * *